United States Patent [19]

Akkapeddi

[11] Patent Number: 4,487,920

[45] Date of Patent: Dec. 11, 1984

[54] POLYAMIDE-POLYOL-TRIAZINE BLOCK COPOLYMER AND ANIONIC POLYMERIZATION PROCESS

[75] Inventor: Murali K. Akkapeddi, Morris County, N.J.

[73] Assignee: Allied Corporation, Morris Township, Morris County, N.J.

[21] Appl. No.: 503,991

[22] Filed: Jun. 13, 1983

[51] Int. Cl.³ .............................................. C08G 69/14
[52] U.S. Cl. ....................................... 528/323; 525/50; 525/419; 525/420; 525/434; 528/314
[58] Field of Search ................... 528/323, 314; 525/50, 525/419, 420, 434

[56] References Cited

U.S. PATENT DOCUMENTS

| | | | |
|---|---|---|---|
| 3,017,391 | 1/1962 | Mottus et al. | 528/323 |
| 3,448,085 | 6/1969 | Pietrusza et al. | 260/78 |
| 3,485,822 | 12/1969 | Pietrusza et al. | 528/323 |
| 3,867,383 | 2/1975 | Winter | 260/249.6 |
| 4,031,164 | 6/1977 | Hedrick et al. | 260/857 |

OTHER PUBLICATIONS

J. Am. Chem. Sol. vol. 70, pp. 3726-3728; "Substituted Chlorodiaminos-triazines"; William M. Pearlman et al. (1948).

J. Org. Chem., vol. 35, No. 11, 1970, pp. 3967-3968; "Cyanuric Chloride, A 'Novel Laboratory Hydrochlorinating Reagent for Alcohols"; Stanley R. Sandler.

Primary Examiner—Harold D. Anderson

Attorney, Agent, or Firm—Alan M. Doernberg; Gerhard H. Fuchs; Kenneth E. Stroup, Jr.

[57] ABSTRACT

Impact modified polyamide/polyether block copolymers have increased impact strength for corresponding polyol concentration, which can be achieved using certain difunctional and tri-functional symmetrical triazine derivatives as the co-catalyst/coupling agent, and lactamyl salts as the catalyst. Also disclosed is an improved anionic polymerization process, especially suitable for reaction injection molding.

The impact modified polyamide/polyether block copolymers have segments of formulae I and II and either III or IV or both III and IV:

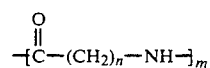

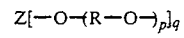

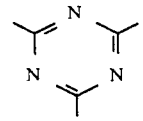

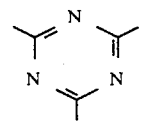

35 Claims, No Drawings

POLYAMIDE-POLYOL-TRIAZINE BLOCK COPOLYMER AND ANIONIC POLYMERIZATION PROCESS

The present invention relates to block copolymers having polyamide blocks formed from lactam monomers and polyol blocks, and to anionic polymerization processes for producing such block copolymers.

The anionic polymerization of lactams such as caprolactam is known to proceed through the use of two solutions, as for example in U.S. Pat. No. 3,017,391 of Mottus et al. (1962). The first solution, known as solution A, contains molten caprolactam in which is dissolved an alkali metal or alkaline earth metal-containing material which, in situ, causes the formation of a caprolactamyl anion. The active catalyst may thus be lithium or sodium caprolactam or may be bromomagnesium caprolactam or similar ionic compounds. The second solution, known as solution B, contains molten caprolactam in which is dissolved a co-catalyst, which in the above patent may be an acyl biscaprolactam such as terephthaloyl bis(caprolactam). Mixing solutions A and B under appropriate temperature conditions causes polymerization to form a polyamide having at some intermediate point in the chain a terephthaloyl moiety between amine ends of polyamide chains, having caprolactamoyl or carboxy end groups and, in most instances, some degree of branching such as at the nitrogen of an amide ligand.

U.S. Pat. No. 3,448,085 to Pietrusza et al. (1969) describes a similar anionic polymerization process using, as the co-catalyst in solution B, symmetrical triazine derivatives such as 2,4,6-trichloro-sym-triazine (also known as cyanuric chloride), 2,4,6-trimethoxy-sym-triazine and 2,4,6-triphenoxy-sym-triazine. See also U.S. Pat. No. 3,485,822 to Pietrusza et al. (1969).

More recently it has been proposed to prepare molded parts by reaction injection molding, injecting into a mold a reactive mixture containing caprolactam or similar lactam monomers. While such a process may proceed through anionic polymerization using similar catalyst and co-catalyst to those described above, it is generally desired to achieve faster cycle times at higher temperatures and to obtain parts with modified properties, and especially increased impact strength, compared to those prepared by the processes described above. U.S. Pat. No. 4,031,164 to Hedrick et al. (1977) discloses block copolymers having lactam-derived blocks (polyamide blocks), polyol blocks and diacyl moieties. It is indicated that, while proportions of polyamide and polyol blocks may vary (see column 11), increased amounts of polyol lead to products with decreased rigidity and increased elongation and water absorption; and it is further reported that low impact strengths are achieved when less than 18% polyol is present.

BRIEF DESCRIPTION OF THE INVENTION

It has been discovered that block copolymers of increased impact strength for corresponding polyol concentration can be achieved using certain di-functional and tri-functional symmetrical triazine derivatives as the co-catalyst/coupling agent. Such results lead to an improved anionic polymerization process, especially suitable for reaction injection molding, and to improved block copolymer products.

Accordingly, the present invention includes an impact modified polyamide/polyether block copolymer molded article having segments of formulae I and II and either III or IV or both III and IV:

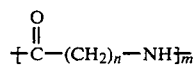  I

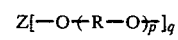  II

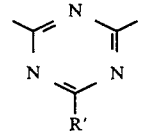  III

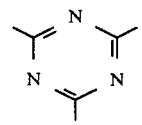  IV with
n being an integer of 3-12; m being an integer, different for individual segments, of 1-150; Z being a polyfunctional moiety or a single bond; q being an integer corresponding to the functionality of Z; p being an integer, different for individual segments of 1-50; R being alkylene of 2-6 carbons; and R' being a monofunctional moiety, inert during polymerization, selected from the group consisting of alkyl, aryl, dialkylamino and diarylamino;

with the triazine rings of segments III and IV being bonded only to the amino of segment I or to either oxygen of segment II; the terminal carbonyl of segment I being bonded only to either oxygen of segment II or to a terminal

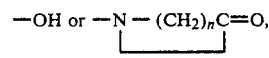

the terminal —NH— of segment I being bonded only to the triazine ring of segment III or IV;

the total segment I constituting between about 55 and about 98 weight percent of the polymer and the total segment II constituting between about 1 and 40 weight percent of the polymer.

The present invention also includes a method for the formation of an impact-modified polyamide block copolymer molded article which comprises reacting:

(a) a cyclic lactam of the formula:

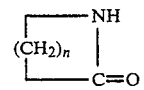 IA with n being an integer of 3-12;

(b) a polyether of the formula Z[—O—R—O)$_p$]q with Z being a polyfunctional moiety or a single bond, q being an integer corresponding to the functionality of Z and with R being alkylene of 2-6 carbons;

(c) a catalyst selected from the group consisting of alkali metals, alkali metal hydrides, alkyl alkaline earth monohalides and aryl alkaline earth monohalides or a lactam salt of the formula

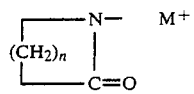

where M+ is an alkali metal cation or alkaline earth metal monohalide cation; and (d) a triazine co-catalyst/coupling agent selected from the group consisting of

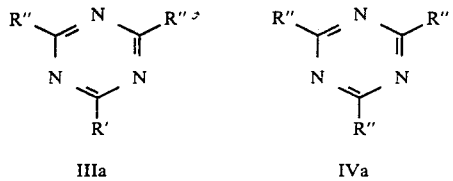

and mixtures thereof; wherein R" is a reactive substituent selected, independently at each occurrence, from the group consisting of alkoxy, aryloxy, halo, oximino, imidazolyl and N-lactamyl; and R' is a monofunctional moiety, inert during polymerization, selected from the group consisting of alkyl, aryl, dialkylamino and diarylamino.

DETAILED DESCRIPTION OF THE INVENTION

There are four necessary reactants in the present process, which find counterparts as three types of residues in the present product. The lactams (e.g., caprolactam) find counterparts as polyamide blocks in the product block copolymers. The polyol (e.g., poly(propylene oxide)) corresponds to polyether blocks. The triazine co-catalyst/coupling agents represented by formulae IIIa and IVa, above, form di-functional and tri-functional residues III and IV in the block copolymer.

The lactam monomer used to form polyamide blocks is preferably caprolactam (n=5), but can also be larger lactams (n=6 to 12) such as lauryllactam (n=11), or smaller (n=3 or 4) as in pyrrolidone (n=3). Mixtures of lactams, such as a major proportion of caprolactam and a minor proportion of lauryllactam, may be used.

The polyol reactants (formula IIa) is generally formed by condensation of alkylene oxide (e.g., ethylene oxide, propylene oxide, tetrahydrofuran) moieties on a polyfunctional moiety $Z(OH)_q$ such as glycerol, pentaerythritol, mannitol, or the like. The number q will correspond to the functionality of Z (e.g., 3 for glycerol, 4 for pentaerythritol). A variety of such polyol reactants $Z-[O-(R-O)_p-H]_q$ are either well-known or commercially available, or both.

When Z is difunctional, and especially a single bond or an alkylene, the polyether may be an oligomer or polymer of the $HO-R-O)_p-Z-(O-R)_p-OH$ type, with R being alkylene of 2-6 carbons and Z being R or a single bond, such as poly(ethylene oxide), poly(propylene oxide), poly(tetramethylene oxide) or poly(hexamethylene oxide). Various types of copolymers of such alkylene oxides are contemplated, with one type being block copolymers A-B-A, wherein B is a relatively long string of propylene oxide-derived moieties, and A is a relatively short string of ethylene oxide-derived moieties. In limited experimentation, however, the pure poly(propylene oxide) polyether, with a predominance of secondary alcohol end-groups, appeared superior for the present process and product to such A-B-A block copolymers of propylene oxide and ethylene oxide, with primary alcohol end-groups. If, however, R" of the co-catalyst is not chloro (as it was in these limited experiments), then the superiority of secondary alcohols may not persist.

The chain length (number 2p) of the polyether (with Z being difunctional) will vary, generally on a random or statistical basis from molecule to molecule, and can be on average quite small or large. For poly(propylene oxide), for example, average molecular weights (average 2p multiplied by 58) will preferably range from 500 to 5000, more preferably from 1000 to 3000. For polyol reactants wherein Z is more than difunctional, the preferred range of q will be smaller (e.g., 2 to 20), decreasing generally as the functionality of Z increases.

The catalyst can be any of those used conventionally for anionic polymerization, being or forming in situ lactamoyl anions. Suitable catalysts include alkali metals (lithium, sodium or potassium), alkali metal hydrides (lithium, sodium or potassium hydride), alkyl alkaline earth metal monohalides (pMgX, pCaX), wherein p is alkyl of 1-6 carbons, for example, and X is Br, Cl or I), aryl alkaline earth metal monohalides (Q'MgX, Q'CaX, wherein Q' is phenyl, substituted phenyl, naphthyl); or a lactamyl salt

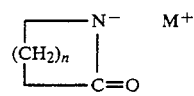

wherein n is an integer of 3-12 and M+ is an alkali metal cation (lithium, sodium or potassium cation) or an alkaline metal earth monohalide cation (MgBr+, MgCl+, MgI+, CaBr+, CaCl+, CaI+). Preferred catalysts are those having Mg, Li, Ca or Na as the metal, with Mg, Na and Li being more preferred. Bromomagnesium caprolactam, sodium caprolactam and magnesium and sodium compounds producing these in situ are most preferred.

The preferred group of co-catalyst/coupling agents are those of formula IIIa having two reactive substituents R" and one non-reactive substituent R'. The reactive substituent R" may be alkoxy (as from 1-6 carbons), aryloxy (such as phenoxy), halo (chloro, bromo or iodo), oximino (as from 3-10 carbons), imidazolyl, or N-lactamyl. Representative such oximino groups for R" include cyclohexanone oximino, methyl ethyl ketone oxime and benzaldehyde oximino, attached to the triazine ring through the oxygen as in:

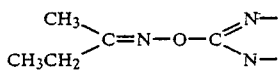

When R" is imidazolyl, the corresponding structure would be

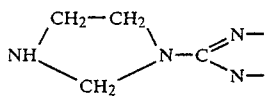

Preferred R" substituents are chloro, bromo, caprolactamyl and phenoxy, with chloro and caprolactamyl being most preferred. The non-reactive substituent R' may be alkyl, aryl, dialkylamino or diarylamino, with dialkylamino being preferred. Each alkyl may be of 1-6 carbons, and is preferably methyl or ethyl in the dialkylamino (dimethylamino, diethylamino or methylethylamino).

Such co-catalyst/coupling agents can be readily prepared, if not commercially available, from starting materials such as cyanuric chloride, using available reactants. Thus, preferred cocatalyst/coupling agents with R" as chloro and R' as dialkylamino can be prepared by reacting cyanuric chloride with dimethylamine or diethylamine in the presence of a suitable acid acceptor, and (if desired) isolating the desired mono(dialkylamino)dichloro-sym-triazine from the monofunctional di(dialkylamino)monochloro-sym-triazine. Small amounts of the latter compound may, however, be left in the co-catalyst/coupling agent as a polymer endgroup. Examples of such preparative processes are described in U.S. Pat. No. 3,867,383 to Winter (1975) (Example 1); Pearlman et al., J. Am. Chem. Soc., Vol. 70, pp. 3726-28 (1948).

To prepare co-catalyst/coupling agents with R" as lactamyl, a compound with R" being chloro is reacted with a source of lactamyl anions (e.g., sodium or potassium caprolactam) or a lactam and an acid acceptor (e.g., caprolactam and triethylamine). If the R"=chloro co-catalyst/coupling agent is used, the reaction with lactamyl anions will occur in situ. Conducting this reaction in advance has the advantage of reducing the induction period for polymerization, which enables shorter cycle times for reaction injection molding.

A slightly less preferred group of co-catalyst/coupling agents are those of formula IVa with three reactive R" groups. R" may be any of the substituents described above for formula IIIa, but is preferably phenoxy or caprolactamyl. It is contemplated to use co-catalyst/coupling agents with different R" moieties, such as are obtained by reacting cyanuric chloride with less than three molar equivalents of sodium phenoxide or bromomagnesium caprolactam, or with mixtures of the two totalling three molar equivalents. Cyanuric chloride itself is somewhat less preferred, because it causes a potential side reaction with the polyol, nucleophilic internal displacement ($SN_i$) reaction, known to take place with simple alcohols, in which —OH is replaced by —Cl. This side reaction results in the formation of cyanuric acid and alkyl chlorides with simple alcohols, see J. Org. Chem., Vol. 35, pp. 3967-68; in the present process the product would be cyanuric acid and chloro-terminated polyethers. The latter can react irreversibly with the catalyst, forming a lactam-terminated polyether which is inert toward further polymerization. Thus, the side reaction would inactivate both catalyst and co-catalyst, causing retardation or termination of polymerization. This side reaction can occur whenever R" is chloro in formula IIIa or IVa.

In general, when the block copolymer has segments of formulae I, II and III, it is preferred that the total segment III constitute about 0.5-5 weight % of the polymer and that the total of segment II constitute about 5-15 weight % (and more preferably about 7-10 weight %) of the polymer. When the block copolymer has segments I, II and IV, it is generally preferred that the total segment IV constitute about 0.5-5 weight % of the polymer and that the total segment II constitute about 5-20 weight % (and more preferably about 10-15 weight %) of the polymer. Lower amounts of segment II within the above ranges are preferred when R" is Cl in formulae IIIa or IVa for the process of making the block copolymer.

While Applicants do not wish to be tied to a particular theory of reaction mechanism, the following explanation is intended to explain how reactant proportions are selected and how the parts of the block copolymer are believed to be arranged. At a site on the co-catalyst/coupling agent, a lactamyl moiety will either be present or be attached in situ as follows:

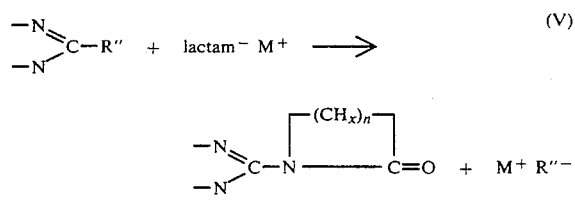

This reactive site may react with a polyether $HO(-R-O)_{2p}H$ either to form

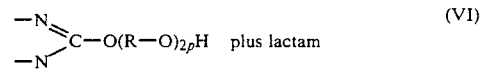

or to form

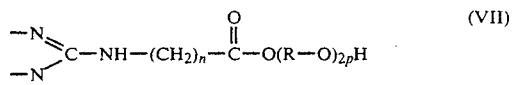

The right end of formula V can react with catalyst to add first a lactamoyl moiety and eventually a string of aminoalkyleneacyl moieties, such that it becomes

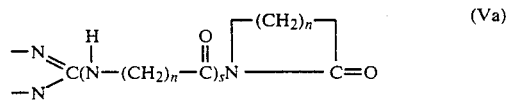

Esterification with the free hydroxyl of formulae VI will terminate the polyamide growth to form a chain

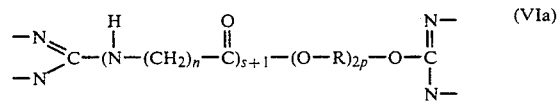

Similar termination of the chain can occur by esterification with the free hydroxyl of formula VII or a free hydroxyl of the original polyether. Similarly reactions with a caprolactamyl triazine such as those forming groups VI and VII can occur with the free hydroxyl of either VI or VII rather than the unreacted polyether. To further complicate matters, some reaction by catalyst at the nitrogen (e.g., the lactam nitrogen in formula V or Va) can occur, leading to a branch point from which two polyamide chains may grow.

Based upon these mechanisms, it is necessary to use more catalyst for the process than the non-lactamyl R" groups on the co-catalyst/coupling agents. For example, with 2-dimethylamino-4,6-dichloro-sym-triazine as co-catalyst/coupling agent, a molar ratio of 2:1 catalyst: co-catalyst could (in theory) be totally consumed making the active sites of formula V, with no catalyst left for polymerization (formula V to Va). Accordingly, molar ratios of at least about 2.5:1 are preferred, and molar ratio between about 3:1 and about 5:1 are more preferred. For triphenoxy-sym-triazine, a 3:1 molar ratio could (in theory) be totally consumed making active sites: therefore a molar ratio of at least about 4:1 is preferred, and molar ratios between about 4.5:1 and about 7.5:1 are more preferred. To the extent R" is lactamyl, the proportion of catalyst required may be reduced, such that the more preferred ratio of catalyst: 2-dimethylamino-4,6-bis(caprolactamoyl)-sym-triazine becomes about 1:1 to about 3:1 instead of about 3:1 to about 5:1 for 2-dimethylamino-4,6-dichloro-sym-triazine.

So long as the catalyst is in excess (as disclosed in the preceding paragraph), the ratio of hydroxyls of the polyol to reactive ends R" of the co-catalyst is believed to determine, size of polyether blocks. The difference in total concentration of reactive ends R" and othydroxyls of the polyol (remaining R" available for polyamide chain growth) will determine the polyamide chain length, and thus the total polymer size.

It can be seen from the preceding discussion that the relationship between R" and free hydroxyls has an effect on polyether and polyamide block size and polymer size. The total proportion of polyether and polyamide blocks, and their sizes, is believed to have a direct effect of the impact properties of parts made from the block copolymer. While, as with the block copolymers of U.S. Pat. No. 4,031,168 to Hedrick et al., impact strength increases with increasing proportion of polyol, excellent impact properties can be obtained in the present block copolymers with less than 18% polyol, with between about 5 and about 15% polyether (segment II), by weight, being most preferred. Examples 1 and 2 show the outstanding properties obtainable with such low polyether levels. Furthermore, with less polyether, the properties of polyamides, such as flexural modulus and heat resistance, are retained in a greater degree than for block copolymers having 18% or more polyether on a weight basis.

EXAMPLES

Materials and Methods

Commercial caprolactam (dry grade) of less than 100 ppm water content was employed. Catalyst solutions designated as Solution A consisted of bromomagnesium caprolactam of known concentration in molten caprolactam and was prepared as described in Example 1. Examples of triazine co-catalyst/coupling agents employed were 2,4,6-triphenoxy-1,3,5-triazine (TPT) and 2-dimethylamino 4,6-dichloro-1,3,5-triazine (DADCT).

DADCT was synthesized and purified by a procedure similar to that described in U.S. Pat. No. 3,867,383. Co-catalyst solution, designated as solution B, consisted of monomer, impact modifier (a polyether polyol) and the co-catalyst/coupling agent.

For polymerizations, a twin barrel stainless steel syringe-type laboratory RIM equipment was used (see Example 1). The polymers were isolated in the form of 6"×6"×⅛" (15 cm×15 cm×0.32 cm) or 6"×8"×⅛" (15 cm×20 cm×0.32 cm) plaques and were cut into various test specimens for mechanical testing. The plaques were normally tested in dry condition and tested according to ASTM procedures.

The mechanical properties, particularly the impact strength, modulus and heat sag properties are related to the crystallinity as well as morphology of polyether and nylon 6 blocks in the amorphous phase.

Crystallinity Determination by X-ray Diffraction

Nylon RIM samples were analyzed by Phillips X-ray diffractometer, parafocus mode at $2\theta = 6°-36°$, CuK$\alpha$ radiation). The amorphous background was centered at about 22°, half with about 9.2°. In routine analysis the $\alpha$ and $\alpha$ phases are identified as follows—$\alpha$ form has two equatorial reflections $\alpha 1$ (200) and $\alpha 2$ (002+202); $\alpha 1$ usually occurs between 20.0° and 20.6°$2\theta$, and $\alpha 2$ between 22.6° and 24.0° $2\theta$. $\Gamma$ form has an intense equatorial reflection $\Gamma 1$, (001) between 21.1° and 21.5° $2\theta$, and a shoulder between 21.9° and 23.0°, $\Gamma 2$ (201+201). Also, the presence of $\Gamma$ form is confirmed independently by the meridional 110 reflection; this is intense if $\Gamma$ is present and very weak if only $\alpha$ as present. In an unoriented sample equatorial and meridonal patterns cannot be distinpuished, but still the interpretation remains unchanged.

Relative ratios of $\alpha$ and $\gamma$ forms in unoriented samples can therefore be determined by comparing the areas under various peaks.

$$\alpha = (\alpha 1 + \alpha 2)/\text{Total Area}$$
$$\Gamma = (\Gamma 1 + \Gamma 2)/\text{Total Area}$$
$$CI = (\alpha + \Gamma)/\text{Total Area}$$

Morphology—Optical and Transmission Electron Microscopy Techniques

Polarizing optical microscope was used to determine the spherulite morphology of nylon RIM samples. For the examination of the polyether and nylon block domains in the amorphous phase, transmission electron microscopy was employed.

The samples were cross-sectioned at −80° C. The sections were stained with 0.25% phosphotungstic acid in a 50:50 mixture of water and ethyl alcohol and then rinsed in water. Phophotungstic acid is an electron dense stain which reacts with available cationic groups of the nylon component. Therefore the electron dense (dark) area of the micrographs represent nylon-rich areas.

EXAMPLES 1-4

The procedure described below for Example 2 was followed for four examples, as shown in Tables I and II, following Example 2.

EXAMPLE 2

The catalyst solution A was prepared by the dropwise addition of 100 mL of 2.9N ethyl magnesium bromide-diethyl ether solution to 0.5 L of dry (<100 ppm H$_2$O) caprolactam at 110° C., with stirring, under a dry nitrogen atmosphere. The addition took about one hour and after stirring an additional 15 minutes, vacuum was gradually applied and maintained at 1 mm Hg (133 Pa) for 20 minutes to remove the last traces of ether and ethane. The nitrogen atmosphere was re-introduced and a 10 mL aliquot of the solution was assayed by titration with 0.1 normal HCl to a phenophthalein end-point. The normality was then adjusted to 0.6426N by dilution with a calculated amount of additional lactam.

Thirty-two mL of this stock solution was then transferred by a pre-heated hypodermic syringe to a mixing tube mounted in a 135° C. oil bath and maintained under a dry nitrogen atmosphere. Thirty-two mL of dry molten monomer was then added to the mixing tube and mixed with the stock catalyst solution by repeatedly withdrawing the solution into the hypodermic syrings. A 60 mL aliquot (19.28 mmol) of this solution was then withdrawn and added to the "A" barrel of a twin-barrel, heat jacketed, stainless steel syringe used for the mixing of "A" and "B" streams and filling the mold. The "A" solution was maintained in the barrel at 135° C. under dry nitrogen. In this experiment the co-catalyst ("B") solution consisted of (a) caprolactam, (b) the impact modifier, Niax ® PPG 4025 (a polypropylene glycol from Union Carbide Corporation), and (c) DADCT. A stock solution containing 36 wt.% PPG 4025 in dry caprolactam was prepared. The moisture content of the polypropylene glycol had previously been reduced to 154 ppm water by vacuum stripping for 20 hours at 100° C. and 1 mm Hg (133 Pa). A 32.0 mL aliquot of this solution was mixed, as previously described, with a freshly prepared solution of 1.39 g of co-catalyst in 32.0 mL of caprolactam. A 60.0 mL aliquot of this solution, containing 13.49 milliequivalents of co-catalyst and 5.40 milliequivalents OH groups was transferred to barrel "B" of the twin-barrel syringe and maintained under dry nitrogen at 135° C. (See Table I for initial compositions).

"A" and "B" solutions were then simultaneously discharged via two ⅛" (0.32 cm) outside diameter stainless steel tubes into a ⅛" (0.32 cm stainless steel) Swagelok tee, wherein they impingement mixed and discharged via a ⅛" (0.32 cm) outside diameter by 2" (5.1 cm) stainless steel hypodermic needle into a 160° C. aluminum mold having a 6"×6"×⅛" (15 cm×15 cm×0.32 cm) cavity. The polymerization proceeded while maintaining the mold at 160° C.; and, after 4 minutes, a slightly colored, rigid plaque completely filling the mold cavity was removed. Its properties are listed under Example 2 in Table II.

Additional co-polymer plaques containing various concentrations of impact modifier are described in examples in Tables I and II.

The tests used for measuring properties reported in Table II were as follows:

(A) Notched Izod by ASTM D-256,
(B) Heat Sag—cantilever heat sag test on a 15.2 cm×2.54 cm×0.32 cm bar with 5 cm clamp support and 10.2 cm overhang at 120°–121° C. for one hour—value reported is the vertical displacement of the free end,
(C) ASTM D-790,
(D) Soxhlet extraction, 24 hours at room temperature,
(E) Reduced viscosity in m-cresol (concentration=0.5%)
(F) by x-ray crystallography,
(G) by dynamic mechanical analyzer with ratios determined by fixing value at 70° C. as 1.

TABLE I

| Nylon-6 RIM Polymerization Compositions and Conditions Using DADCT | | | | |
|---|---|---|---|---|
| Example | 1 | 2 | 3 | 4 |
| Polymerization Compositions | | | | |
| Wt. % Impact Modifier | 7.5* | 9.0* | 12.0* | 9.0** |
| Catalyst "A" Solutions | | | | |
| Meq. BrMgC.L. | 16.07 | 19.28 | 25.70 | 19.65 |
| Meq. Caprolactam | 499.3 | 493.2 | 480.8 | 493.2 |
| Co-catalyst "B" Solution: | | | | |

TABLE I-continued

| Nylon-6 RIM Polymerization Compositions and Conditions Using DADCT | | | | |
|---|---|---|---|---|
| Example | 1 | 2 | 3 | 4 |
| Meq. DADCT | 11.25 | 13.49 | 18.03 | 13.49 |
| Meq. OH (Polyol) | 4.50 | 5.40 | 7.20 | 7.71 |
| Meq. Caprolactam | 456.0 | 434.8 | 403.0 | 434.8 |
| Equiv. Ratio: | | | | |
| Caprolactam | 100 | 100 | 100 | 100 |
| Catalyst | 1.68 | 2.08 | 2.91 | 2.1 |
| Co-catalyst (as R″) | 1.18 | 1.45 | 2.04 | 1.45 |
| Polyol (as OH) | 0.47 | 0.58 | 0.816 | 0.83 |
| Eq. polyol/co-catalyst | 0.4 | 0.4 | 0.4 | 0.57 |
| MOLDING CONDITIONS | | | | |
| Mixing Temperature | 135° C. | 135° C. | 135° C. | 135° C. |
| Molding Temperature | 160° C. | 160° C. | 160° C. | 160° C. |
| Demolding Time | 4 min. | 4 min. | 4 min. | 4 min. |
| Appearance | Rigid, white | Rigid, white | Flexible, yellow | Rigid, offwhite |

*PPG 4025 Polypropylene oxide (MW 4000) from Union Carbide.
**NIAX E351 Polypropylene oxide (MW 2800, endcapped with ethylene oxide) from Union Carbide.

TABLE II

| PROPERTIES USING DCDAT | | | | |
|---|---|---|---|---|
| Example | 1 | 2 | 3 | 4 |
| (A) Notched Izod (Dry) | | | | |
| At 23° C. | | | | |
| ft-lbs/in | 14.7 | 17 to 22 | 3.2 | 2.3 |
| kg-cm/cm² | 80 | 93 to 120 (NB) | 17.5 | 12.5 |
| At −29° C. | | | | |
| ft-lbs/in | 2.0 | 3.3 | 2.3 | — |
| kg-cm/cm² | 11 | 18 | 12.5 | — |
| (B) Heat Sag (cm) | — | 0.25 | 0.1 | — |
| (C) Flexural Modulus | | | | |
| psi | 298,000 | 289,000 | — | 340,000 |
| kg/cm² | 20,320 | 19,700 | — | 23,180 |
| (D) Acetone Extractables (%) | 0.89 | 2.76 | 1.19 | |
| (E) Reduced Viscosity (dL/g) | 8.17 | 2.97 | 1.63 | |
| (F) Crystallinity Index (x-ray) | 49% | 47% | 45% | |
| (G) Dynamic Moduli At | | | | |
| −30° C. | 5.62 | 7.94 | 8.7 | |
| 25° C. | 4.5 | 5.25 | 1.7 | |
| 70° C. (set at 1) | 1 | 1 | 1 | |

Nylon-6 Polyether block copolymer rim polymerization with 2,4,6-triphenoxy-1,3,5-triazine (TPT) as co-catalyst/coupling agent

EXAMPLE 5

A solution of 29.95 g of polypropylene glycol, molecular weight 4000 and 5.247 g of triphenoxytriazine in caprolactam was vacuum stripped so that the final weight of caprolactam was 67.79 g.

At the same time a solution of bromomagnesium caprolactam was prepared from a mixture of 20.6 mL of ethyl magnesium bromide, 2.0 molar in ethyl ether, and 104.74 q of caprolactam.

Fifty mL aliquots of each solution at 135° C. were injected simultaneously through a single nozzle into a mold heated at 160° C. The mold was 7"×7"×⅛"(17,8 cm×17.8 cm×0.32 cm). After four minutes, the resulting plaque was removed.

The composition was 1.30 equivalents of diol to 100 equivalents of caprolactam to 2.97 equivalents of triphenoxy-triazine to 4.11 equivalents of bromomagnesium caprolactam with 17.7% by weight of diol. The notched IZOD impact (by ASTM D-256, condition dry) in foot-pounds with a four pound (1.8 kg) loading was 18.2 (99.2 kg-cm/cm) at 23° C., and 4.1 (22.3 kg-cm/cm) at −29° C., all with partial breaks. The specimens were mold dry.

The polymerizations were repeated under various conditions as shown in Table III.

TABLE III

Nylon 6-polyether Block Copolymers With Triphenoxy Triazine (TPT) as Cocatalyst

| Ex. # | Polyol Type | Polyol (wt %) | TPT (Eqvts/100 Eqvt of Caprolactam) | | Cat |
|---|---|---|---|---|---|
| 6 | PPG 4025 | 17.7 | 1.35 | 2.98 | 4.11 |
| 7 | " | 17.8 | 1.32 | 2.12 | 2.9 |
| 8 | " | 13.3 | 0.93 | 1.87 | 2.8 |
| 9* | " | 10 | 0.66 | 1.46 | 2.27 |
| 10 | Niax E351 | 17.5 | 1.91 | 2.92 | 4.01 |
| 11 | " | 11 | 1.08 | 2.06 | 3.04 |
| 12 | " | 11 | 1.09 | 2.39 | 3.72 |
| 13 (Nylon 6) | None | — | — | 1.0 | 1.99 |

| | Notched Izod Impact ft-lbs/in (kg-cm/cm) | | Crystallinity |
|---|---|---|---|
| Ex. # | 23° C. | −29° C. | Index |
| 6 | 18.1 (98.6) (PB) | 9.4 (51.2) (PB) | 44% |
| 7 | 22.5 (123) (NB) | 4.2 (22.9) (HB) | 42% |
| 8 | 21.2 (116) (NB) | — | — |
| 9* | 4 (21.8) (HB) | 1.2 (6.54) (CB) | — |
| 10 | 5 (27.2) (PB) | 3.1 (16.9) (PB) | 48% |
| 11 | 2 (10.9) (CB) | 0.7 (3.8) (CB) | — |
| 12 | 3.9 (21.2) | 0.8 (4.4) | — |
| 13 | 0.5 (2.7) (CB) | — | — |

N.B.: — No Break; P.B.: — Partial Break; H.B.: — Hinge break; C.B.: — Complete break
*12 min. molding time, all others 3–4 minute molding time.

What is claimed:

1. An impact modified polyamide/polyether block copolymer molded article having segments of formulae I and II and either III or IV or both III and IV:

$$\begin{matrix} O \\ \| \\ \{C-(CH_2)_n-NH\}_{\overline{m}} \end{matrix} \qquad I$$

$$Z[-O\{-R-O\}_{\overline{p}}]_q \qquad II$$

III

IV with
n is being an integer of 3-12; m being an integer, different for individual segments, of 1-150; Z being a polyfunctional moiety or Z being a single bond; q being an integer corresponding to the functionality of Z; p being an integer, different for individual segments of 1-50; R being alkylene of 2-6 carbons; and R′ being a monofunctional moiety inert during polymerization, selected from the group consisting of alkyl, aryl, dialkylamino, and diarylamino;
with the triazine rings of segments III and IV being bonded only to the amino of segment I or either oxy of segment II, the terminal carbonyl of segment I being bonded only by either oxy of segment II or to a terminal —OH or $$-\underset{|_____}{N}-(CH_2)_mCO,$$

the terminal —NH— of segment I being bonded only to the triazine ring of segment III or IV;
the total segment I constituting between about 55 and about 98 weight % of the polymer and the total segment II constituting between about 1% and about 40 weight % of the polymer.

2. The block copolymer molded article of claim 1 wherein n is 5.

3. The block copolymer molded article of claim 2 wherein Z is a single bond.

4. The block copolymer molded article of claim 3 wherein R is 1,2-propylene.

5. The block copolymer molded article of claim 3 wherein p is between 2 and 35 on a number average basis.

6. The block copolymer molded article of claim 1 having segments of formulae I, II and III, with the total of segment III constituting about 0.5–5 weight % of the polymer and the total of segment II constituting about 5–15 weight % of the polymer.

7. The block copolymer molded article of claim 6 wherein n is 5.

8. The block copolymer molded article of claim 7 wherein R is 1,2-propylene.

9. The block copolymer molded article of claim 8 wherein R′ is dialkylamino.

10. The block copolymer molded article of claim 9 wherein R′ is dimethylamino.

11. The block copolymer molded article of claim 1 having segments of formulae I, II and IV, with the total of segment IV constituting about 0.5–5 weight % of the polymer and the total of segment II constituting about 5–20 weight % of the polymer.

12. The block copolymer molded article of claim 11 wherein n is 5.

13. The block copolymer molded article of claim 12 wherein Z is a single bond.

14. The block copolymer molded article of claim 13 wherein R is 1,2-propylene.

15. A method for the formation of impact-modified polyamide block copolymer molded article which comprises reacting:

(a) a cyclic lactam of the formula:

$$\begin{matrix} \underset{\|\_\_\_\_\_}{\phantom{x}}-NH \\ (CH_2)_n \quad | \\ \underset{|\_\_\_\_\_}{\phantom{x}}-C=O \end{matrix}$$

with n being an integer of 3-12;

(b) a polyether of the formula $Z[-O-R-O)_pH]_q$ with Z being a polyfunctional moiety or Z being a single bond, q being an integer corresponding to the functionality of Z, with R being alkylene of 2-6 carbons and p being an integer of 1-50;

(c) a catalyst selected from the group consisting of alkali metal hydride, alkali metals, alkyl alkaline earth monohalides and aryl alkaline earth monohalides or a lactam salt of the formula $$\begin{array}{c} \underset{|}{\text{N}^-} \quad \text{M}^+ \\ (\text{CH}_2)_m \\ \underset{}{\phantom{|}} \\ \text{C}=\text{O} \end{array}$$

where M+ is an alkali metal cation or an alkaline earth metal monohalide cation; and (d) a triazine co-catalyst/coupling agent selected from the group consisting of $$\begin{array}{cc} \text{R''} \diagdown_{\text{N}} \diagup \text{R''} & \text{R''} \diagdown_{\text{N}} \diagup \text{R''} \\ \text{N} \diagdown \text{N} & \text{N} \diagdown \text{N} \\ \diagup \text{R'} & \diagup \text{R''} \\ \text{IIIa} & \text{IVa} \end{array}$$

and mixtures thereof, wherein R" is a reactive substituent selected, independently at each occurrence, from the group consisting of alkoxy, aryloxy, halo, oximino, imidazolyl and N-lactamyl and R' is a monofunctional moiety, inert during polymerization, selected from the group consisting of alkyl, aryl, dialkylamino and diarylamino.

16. The method of claim 15 wherein n is 5.
17. The method of claim 15 wherein Z is a single bond.
18. The method of claim 17 wherein R is 1,2-propylene.
19. The method of claim 15 wherein M+ is MgBr+.
20. The method of claim 15 wherein M+ is Na+.
21. The method of claim 15 wherein the triazine co-catalyst/coupling agent is of formula IIIa.
22. The method of claim 21 wherein R' is dialkylamino.
23. The method of claim 22 wherein R' is dimethylamino.
24. The method of claim 21 wherein R" is chloro in both occurrences.
25. The method of claim 21 wherein R" is $$-\overset{\lceil\phantom{xxx}\rceil}{\text{N}(\text{CH}_2)_5\text{C}}=\text{O}$$

in both occurrences.

26. The method of claim 21 wherein the polyether is reacted in an amount between about 1 and 40 percent of the total reactants.
27. The method of claim 15 wherein the triazine co-catalyst/coupling agent is of formula IVa.
28. The method of claim 27 wherein R" is phenoxy in all occurrences.
29. The method of claim 27 wherein R" is $$-\overset{\lceil\phantom{xxx}\rceil}{\text{N}(\text{CH}_2)_5\text{C}}=\text{O}$$

in all occurrences.

30. The method of claim 27 wherein the polyether is reacted in an amount between about 1 and 40 percent of the total reactants.
31. The method of claim 15 wherein the polyether is reacted in an amount between about 1 and 40 percent of the total reactants.
32. The method of claim 15 comprising mixing two solutions, with the catalyst being contained in the first solution and the triazine co-catalyst/coupling agent being contained in the second solution.
33. The method of claim 32 wherein the first solution contains a first portion of cyclic lactam and the catalyst and the second solution contains a second portion of the cyclic lactam, the triazine co-catalyst/coupling agent and the polyether.
34. The method of claim 32 wherein the two solutions are mixed and injected into a mold maintained at sufficient temperature to cause polymerization into a shaped article of the impact-modified block copolymer.
35. The method of claim 34 wherein the polymerization occurs in under five minutes.

* * * * *